United States Patent [19]

Ciliberti et al.

[11] Patent Number: 4,615,283
[45] Date of Patent: Oct. 7, 1986

[54] APPARATUS AND METHOD FOR DISPOSAL OF HAZARDOUS WASTE MATERIAL

[75] Inventors: David F. Ciliberti, Murrysville Boro; Thomas E. Lippert, Murrysville; David H. Archer, Ross Township, Allegheny County, all of Pa.

[73] Assignee: Westinghouse Electric Corp., Pittsburgh, Pa.

[21] Appl. No.: 654,695

[22] Filed: Sep. 26, 1984

[51] Int. Cl.⁴ .............................................. F23J 3/00
[52] U.S. Cl. ................................. 110/216; 110/210; 110/215; 122/4 D
[58] Field of Search ............... 110/245, 246, 210, 211, 110/216, 217; 122/4 D

[56] References Cited

U.S. PATENT DOCUMENTS

| | | | |
|---|---|---|---|
| 3,745,939 | 7/1973 | Allbritton | 110/216 |
| 3,822,651 | 7/1974 | Harris et al. | |
| 3,884,162 | 5/1975 | Schuster | 110/216 |
| 4,055,125 | 10/1977 | Mallek | 110/216 |
| 4,066,024 | 1/1978 | O'Conner | |
| 4,226,584 | 10/1980 | Ishikawa | 432/77 |
| 4,373,452 | 2/1983 | VanDewoestine | 110/210 |
| 4,384,549 | 5/1983 | Enga | 122/4 D |
| 4,395,958 | 8/1983 | Caffyn et al. | 110/216 |
| 4,440,098 | 4/1984 | Adams | 110/215 |
| 4,502,395 | 3/1985 | Barnett | 110/210 |

OTHER PUBLICATIONS

"The Resource Authority in Sumner County, Waste-to-Energy Plant, Gallatin, Tennessee" by STV/Sanders & Thomas, Inc.

Primary Examiner—Henry C. Yuen
Attorney, Agent, or Firm—Daniel C. Abeles

[57] ABSTRACT

A waste disposal system for the combustion of waste materials, that may include toxic chemical waste, wherein the wastes are combusted in a combustion unit with combustion gases directly discharged into a refractory lined housing having a plurality of ceramic filters disposed in the gas outlet wall thereof. The combustion gases are maintained in the refractory lined housing for a period of time sufficient to effect combustion of the major portion of residual vaporous waste constituents therein and then passed through the ceramic filters to remove the remainder of said vaporous waste constituents and the residual solid waste constituents. The waste-free, hot combustion gases, after passage through the filters, are directed to a heat exchanger for recovery of heat values therefrom. Soils contaminated with a toxic chemical waste may be decontaminated by charging the soil as a portion of a combustible waste charge to the combustion unit, with the toxic chemical waste subjected to combustion, with the resultant decontaminated soil, along with ash from the combustible waste used as a landfill.

10 Claims, 1 Drawing Figure

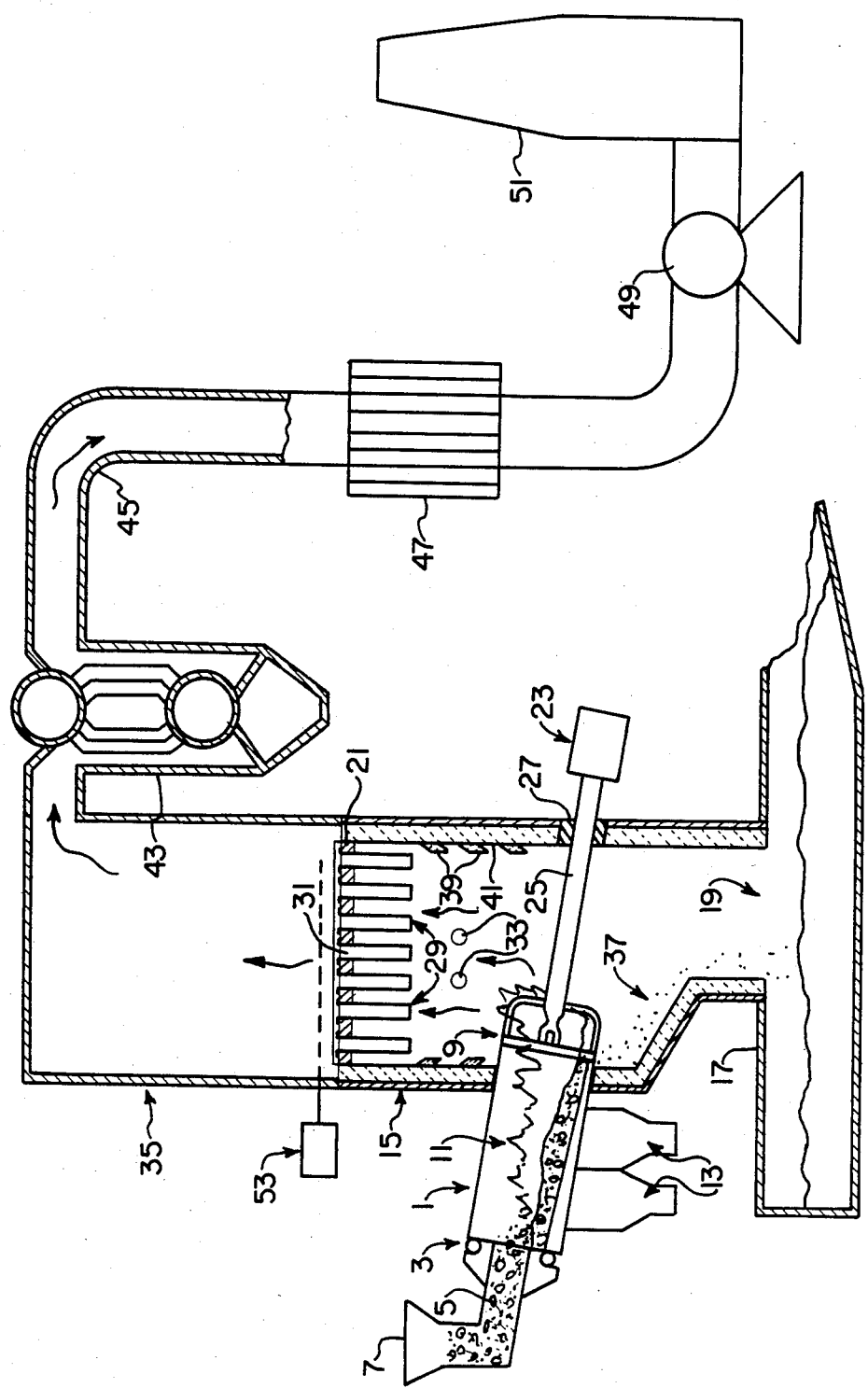

APPARATUS AND METHOD FOR DISPOSAL OF HAZARDOUS WASTE MATERIAL

FIELD OF THE INVENTION

The present invention relates to a system and method for the disposal of hazardous waste which assures that both residual solid and vaporous waste constituents are removed from the hot combustion gases, produced by combustion of wastes, prior to use of the hot gases in a heat exchanger and release to the atmosphere.

BACKGROUND OF THE INVENTION

The use of combustion for the disposal of wastes has long been a known technique. By combustion of the waste material, the bulk is greatly reduced and heat recovered from the combustion can be used as an energy source.

Numerous types of combustors for waste material have been proposed. A useful type of combustion unit is that type described in U.S. Pat. Nos. 3,822,651; 4,066,024 and 4,226,584, the contents of those three patents being incorporated by reference herein, generally known as the O'Conner combustor. This type of combustor uses a rotary kiln that is formed by a plurality of pipes that form an inner cylindrical surface, the pipes adapted for flow of water therethrough, with steam produced that is separated from the water in the pipes. Air is charged to the kiln through porous means intermediate the pipes of the combustion unit, and combustion gases from the unit pass to a boiler for further production of steam. This type of combustor has been found very useful in waste disposal while providing revenue through generation of steam and electric power. An installation using such a combustor is the Resource Authority in Sumner County waste-to-energy plant at Gallatin, Tenn., which processes trash from the surrounding area and routinely reduces the volume of the trash by more than ninety percent, with resultant ash hauled to a landfill.

While such a waste disposal system is useful in processing of common waste materials, such a system may not be suitable for use in disposal of waste material which may contain hazardous waste constituents such as polychlorinated biphenyls (PCB's), or the like. Since such hazardous waste constituents, whether initially present in the waste or added thereto for disposal purposes, are relatively high boiling organic compounds, a small amount may escape combustion and destruction in the combustion unit and may pass through the system in the neighborhood of relatively cool walls. Although the proposed mechanism of escape from the system is likely to account for only a small fraction of the feed, environmentally imposed limits may preclude even such small residues. Even if afterburners or some other means to completely combust the residual hazardous waste material were to be used, considerable incremental capital and operating costs would be associated with such a system.

The proper disposal of hazardous chemical waste has become a major focus of governmental agencies. In the incineration of PCB's, for example, stringent requirements must be met as imposed by the Environmental Protection Agency. It is thus imperative that efficient and effective means for waste treatment be used so that hazardous materials can be safely disposed of, and soils contaminated with hazardous materials can be reclaimed.

It is an object of the present invention to provide a waste disposal system that will dispose of waste by combustion and remove residual solid and vaporous waste constituents from the combustion gases discharged from a combustion unit.

It is another object of the present invention to produce, from waste combustion gases, a substantially uniformly high temperature, clean, waste-free gas from which heat values can be recovered.

It is another object of the present invention to provide a system for disposal of waste materials and destroying hazarous wastes from contaminated soils while providing steam as an energy source.

SUMMARY OF THE INVENTION

A waste disposal system for the combustion of waste materials, including toxic wastes, uses a combustion unit having a combustion zone and a discharge end, with ash and combustion gases, containing residual solid waste constituents and uncombusted residual vaporous waste constituents, discharged directly to a refractory lined filter housing. The refractory lined filter housing has a plurality of ceramic filters disposed in a gas outlet wall thereof, that are maintained at temperatures that are necessary for the destruction of vaporous waste constituents. The hot combustion gases are maintained in the hot refractory lined filter housing for a period of time sufficient to effect combustion of the major portion of residual vaporous waste constituents therein, and the gases are then passed through the ceramic filters to remove the remainder of the residual vaporous waste constituents and the residual solid waste constituents therefrom, by assuring that all gases leaving the refractory lined chamber have reached the substantially uniform high temperature of the chamber, to produce a waste-free gas that is directed to a heat exchanger for recovery of heat values therefrom.

The ceramic filters remove the solids and retain the same in the refractory lined housing. These ceramic filters also assure a substantially uniform high temperature of all gases passing through the system and such filters may provide catalytic combustion of any residual hazardous waste vaporous constituents. Periodic jet pulsing of the filters dislodge solids therefrom into the housing such that the same fall by gravity to an ash pit. Baffles are provided on the interior wall of the refractory lined filter housing to enhance mixing of gases and assure adequate retention time and temperature for the gases in the housing.

The waste disposal method provides for discharging the hot combustion gases from a waste combustor directly into a refractory lined filter housing, maintaining the hot gases in the housing for a period of time sufficient to effect combustion of the major portion of uncombusted residual vaporous constituents therein, passing the hot combustion gases, after combustion of the major portion of vaporous constituents, through a plurality of ceramic filters disposed in the housing to remove the remainder of vaporous constituents and remove residual solid waste constituents and produce a substantially uniformly hot waste-free gas, and recovering heat from the hot waste-free gas.

DESCRIPTION OF THE DRAWING

The drawing is a schematic cross-sectional view of a waste disposal system of the present invention illustrating the method of waste disposal.

DETAILED DESCRIPTION

The present invention provides a system and method for disposal of waste material which are especially suited for the disposal of hazardous wastes. There is provided a means for assuring that residual solid waste material and uncombusted residual vaporous solid waste material, that may be carried in combustion gases from a combustor for wastes, are removed from the combustion gases to provide a waste-free gas for use in a boiler, which waste-free gas can then be discharged to the atmosphere.

The present system may be used for the disposal of conventional waste materials such as municipal solid waste or for the disposal of hazardous waste materials. The system is also usable for the reclamation of soils or other solids contaminated with hazardous chemical wastes where a portion of the feed to the combustor comprises such solids and/or other solids in admixture with combustible wastes.

According to the present method for disposal of waste material, the material is combusted in a combustion unit under conditions that will effect combustion of substantially all of the waste. The combustion gases from the combustion unit, along with ash produced, are discharged from the combustor into a refractory lined filter housing or chamber. The ashes will fall by gravity to a collection system such as an ash pit or quench tank. The term "ash" as used herein is meant to include recoverable solids in the feed as well as combustion residue. The combustion gases, however, will contain small residual solid waste constituents which may be in completely combusted form or which may be partially uncombusted, as well as uncombusted residual vaporous waste constituents.

The hot combustion gases are discharged directly from the combustion unit into a refractory lined filter housing that has a series of ceramic filters disposed therein. These ceramic filters, preferably of a closed end of the combustion gases, with the gases maintained at high temperatures in the filter housing due to the refractory lining. The hot combustion gases are maintained in the filter housing and in contact with the hot ceramic filters for a period of time that will effect combustion of the uncombusted residual vaporous waste constituents in the gases prior to passage thereof from the filters and filter housing. A catalytic material that will be effective to catalytically decompose vaporous constituents may be incorporated into the ceramic composition of the filter to enhance the removal of vaporous constituents. The type and amount of the catalytic material would be dependent upon the vaporous constituents to be removed.

In instances where chemical waste materials are present in the feed to the combustor, such as polychlorinated biphenyls (PCB's), dioxin, and the like, the temperatures within the filter housing should be maintained at an elevated temperature, such as 800° to 1200° C. (1600° to 2200° F.) or higher, for a period of time to effect complete combustion of such chemical wastes. The retention time may vary dependent upon the chemical wastes present as uncombusted vaporous waste constituents in the combustion gases and the temperature at which such constituents are maintained in the refractory lined filter housing.

After the combustion gases have been maintained in the filter housing at the desired temperature and for a period of time sufficient to effect combustion of the major portion of vaporous waste constituents that were carried by the combustion gases, the hot combustion gases which will still contain residual solid waste materials are passed through hot ceramic filters disposed in the filter housing. The passage of the hot gases through the filter may be effected by the use of an induction fan downstream of the filters, or other means. Passage of these hot combustion gases through the ceramic filters will remove the remainder of the vaporous waste constituents and produce a substantially uniformly hot waste-free gas, in which there exists no unheated, cooler, pockets of gas, and from which heat may be recovered without further need to clean the same.

Upon passage through the ceramic filters, preferably of a closed end, tubular type, the residual solid waste constituents that were present in the hot combustion gases are collected in the filter housing on the filters and removal from the gases effected. Because the ceramic filters are exposed to the high temperatures that are maintained in the refractory lined filter housing, the filters must be of a material and design that will withstand such temperatures. Such ceramic filters are known and commercially available, for example from Schumacher'sche Fabrik, Bietighein, F.R.G. Usable ceramic filters are described in "How Hot Gas Cleaning Improves the Economics of Electricity-from-Coal", by G. P. Reed, *Filtration & Separation*, March/April, 1984, pp. 120-124.

The ceramic filters, preferably ceramic tubes, should be capable of withstanding temperatures of up to about 1200° C. The ceramic filters are substantially absolute barriers to solid particulate materials and are periodically cleaned such as by jet pulse cleaning such that collected solids are deposited into the ash pit or soaking tank.

By maintaining the hot combustion gases in the refractory housing for a period of time sufficient to effect combustion of the major portion of residual vaporous waste constituents, no afterburners are required, following the combustion unit, which are costly to provide and maintain. Also, since the ceramic filters are barriers to particulates and aerosols, virtually no materials, other than gases, pass through the ceramic filters. It is also possible that the porous ceramic filters can act as a catalytic agent; or catalytic materials can be incorporated into the ceramic filter composition. All the gases must permeate the accumulated dust collected and the ceramic filter body at high temperatures. The ceramic filter is composed of a ceramic sinter of finely divided materials and as such, would be ideal as an additional aid in decomposition of organic constituents in the waste gases.

The present system may be used in the combustion of conventional wastes or municipal solid waste, but is especially useful where toxic chemical wastes form a portion of the waste material. In such instances, prevention of any such toxic chemical waste, or uncombusted portions thereof in the combustion gases, from reaching the downstream boiler, associated equipment and the environment must be assured. For example, conventional waste materials may be charged to the combustion unit to provide the bulk of the combustor charge and provide combustible material while a portion of the charge may comprise a toxic chemical waste. Also, the system may be used to decontaminate soil that is contaminated with chemical toxic waste by adding such contaminated soil as a minor portion of a charge of combustible material to be combusted. The toxic chemical waste material would be combusted within the system while the soil and other uncombustible material is collected as ash which can be safely used as a landfill material. Also, the system can be used to recover valuable solids from admixtures with combustible wastes.

A preferred disposal system is illustrated in the drawing which shows the system used in conjunction with a rotary combustion unit. The combustion unit 1 has a charging end 3 to which waste material 5 is fed through a hopper 7. The combustion unit 1 has a discharge end 9 and is preferably water cooled by tubes (not shown) which surround the combustion zone 11 of the combustion unit 1, with air for combustion charged through line 13.

The discharge end 9 of the combustion unit 1 is enclosed within a refractory lined housing 15 which extends from an ash pit or quench tank 17 at one end 19 to a gas outlet wall 21. A rotary joint 23 is provided that serves to feed water through a pipe 25 to the tubes of the rotary combustor, and return steam for heat recovery, with a seal 27 surrounding the pipe 25 in a wall of the refractory lined housing 15. Disposed in the gas outlet end wall 21 are a plurality of ceramic filters 29, the ceramic filters 29 preferably comprising tubular ceramic filters 31 which extend into the refractory lined filter housing 15. Burners 33 may be provided for start-up of the combustion system. A boiler 35 is provided adjacent the refractory lined filter housing on the outside of the gas outlet end wall 21.

As the waste material 5 passes through the combustion zone 11 of the combustion unit 1, the waste material is burned, with ash 37 formed that flows from the discharge end 9 into the refractory lined filter housing 15 and falls by gravity to the ash pit and quench tank 17. In the combustion zone 11, the hot combustion gases produced will be discharged through the discharge end 9 directly into the refractory lined housing 15, the hot combustion gases, indicated by the arrows in the drawing, carrying therewith residual solid waste constituents and uncombusted residual vaporous waste constituents. Baffles 39 are provided about the inner surface 41 of the refractory lined housing 15 between the combustor discharge 9 and the ceramic filters 29 so as to provide for a tortuous flow path for gases rising along the inner surface 41 and prevent channelling of the gases, to assure a desired retention time of gases in the hot filter housing 15. The baffles 39 preferably have downwardly sloped upper surfaces to prevent collection of solids on the upper surface thereof. The clean, waste-free, hot gases, after passage through the filters, pass to the boiler 35 where the gases are used to produce steam in the boiler 35 and associated boiler bank 43. The waste-free gases are then passed through conduit 45 to a heat exchanger 47 where the gases may be used to preheat combustion gases for use in line 13. Because the gases are waste-free and clean, they may then pass through an induction fan 49 to a stack 51 for discharge to the atmosphere. A jet pulse cleaning system 53 is provided in conjunction with the ceramic filters 29 to periodically disengage residual solid waste constituents from the ceramic filters, with such solids falling by gravity to the ash pit or quench tank 17.

Since the system confines all of the potentially hazardous solid ash residues to the combustor, filter housing and ash pit, virtually none of the downstream equipment such as the boiler surface, heat exchanger surface, alternative gas cleaning equipment and stack system can be contaminated. In the present system, since none of the solids pass through the filter housing and ceramic filters, this eliminates the need for further gas cleaning equipment, such as a bag house, electrostatic precipitator, scrubber, or the like, for the waste-free gases, which equipment is also expensive to provide and maintain.

Also, by using the ceramic filters as a barrier to solids, the hot waste-free gases will maintain higher boiler efficiency. Clean boiler and air heater surfaces will yield higher heat transfer values and greatly reduce maintenance costs associated with these components. In addition, the use of the ceramic filters as barriers will enable the system to accommodate system upsets and start-up/shutdown procedures without ever compromising containment of hazardous materials.

What is claimed is:

1. In a waste disposal system for the combustion of waste material, having a rotary combustion unit with a charging end and a discharge end, with waste material charged to the combustion unit and subjected to combustion during passage therethrough, and with ash and hot combustion gases, containing residual solid waste constituents and uncombusted residual vaporous waste constituents, discharged from the combustion unit, with ash deposited in a collection tank, the improvement wherein:

a refractory lined filter housing encloses the discharge end of said combustion unit, said housing having a gas outlet wall at the upper end thereof and baffles on the interior surface thereof having downwardly sloping upper surfaces disposed between the discharge end of said combustion unit and a plurality of tubular ceramic elements;

said plurality of tubular ceramic filter elements are disposed within the gas outlet wall of said housing and extend into said refractory lined filter housing having a catalytic material incorporated therein effective to decompose vaporous waste constituents present in said combustion gases such that hot combustion gases containing said residual solid waste constituents and said uncombusted residual vaporous waste constituents are maintained at an elevated temperature within the filter housing for a period of time sufficient to affect combustion of the major portion of said residual vaporous waste constituents, and the hot combustion gases pass from said housing through the ceramic filters to affect removal of the remainder of said residual vaporous waste constituents and said residual solid waste constituents therefrom and to produce substantially uniformly high temperature resultant hot, waste-free gases;

a jet pulse cleaning system to periodically discharge residual solid waste constituents from said ceramic filters; and a heat exchanger adjacent said filter housing into which said hot, waste-free gases are directed to recover heat values therefrom.

2. A method for the disposal of waste material by combustion wherein the waste material is subjected to combustion in a rotary combustion unit, with ash and hot combustion gases, containing residual solid waste constituents and uncombusted residual vaporous waste constituents, produced comprising;

discharging said hot combustion gases directly from the combustion unit into a refractory lined filter housing having a plurality of tubular ceramic filter elements disposed therein extending into said refractory lined filter housing having a catalytic material incorporated therein effective to decompose vaporous waste consituents present in said combustion gases;

maintaining said hot combustion gases in said refractory lined filter housing, while directing said hot combustion gases along a tortuous path by baffles on the interior surfaces of said refractory lined filter housing between said discharge from the combustion unit and passage through said ceramic filters, for a period of time sufficient to affect combustion of the major portion of said uncombusted residual vaporous waste constituents;

passing said hot combustion gases, after combustion of the major portion of said vaporous waste constituents through said ceramic filters to remove the remainder of said residual vaporous waste constituents and said residual solid waste constituents therefrom and produce a substantially uniformly high temperature waste-free gas;

periodically cleaning said ceramic filters using jet pulse cleaning to dislodge solids collected thereon into said filter housing; and recovering heat from said hot waste-free gas.

3. The method for disposal of waste material as defined in claim 2 wherein a portion of toxic chemical waste is added to combustible waste material subjected to said combustion.

4. The method for disposing of waste material as defined in claim 3 wherein said portion of toxic chemicals is added in the form of soil contaminated with said toxic chemicals.

5. The method for disposal of waste material as defined in claim 4 wherein said hot combustion gases are maintained at a temperature of about 1200° C. in said refractory lined filter housing.

6. The method for disposal of waste material as defined in claim 5 wherein said toxic chemicals are polychlorinated biphenyls.

7. A method for the decontamination of soil contaminated with a toxic chemical waste by combustion comprising:

charging said contaminated soil as a portion of a charge of combustible waste material to a rotary combustion unit;

subjecting said charge to combustion within the combustion unit to decontaminate said soil by combustion of toxic chemical wastes therein;

discharging ash, decontaminated soil, and hot combustion gases, containing residual solid waste constituents and uncombusted residual vaporous waste constituents directly from the combustion unit into a refractory lined filter housing having a plurality of tubular ceramic filter elements therein extending into said refractory lined filter housing having a catalytic material incorporated therein effective to decompose vaporous waste constituents present in said combustion gases;

maintaining said hot combustion gases in said refractory lined filter housing, while directing said hot combustion gases along a tortuous path by baffles on the interior surfaces of said refractory lined filter housing between said discharge from the combustion unit and passage through said ceramic filters, for a period of time sufficient to affect combustion of the major portion of said uncombusted residual vaporous waste constituents;

passing said hot combustion gases, after combustion of the major portion of said vaporous waste constituents through said ceramic filters to remove the remainder of said residual vaporous waste constituents and said residual solid waste constituents therefrom and produce a substantially uniformly high temperature waste-free gas;

periodically cleaning said ceramic filters using jet pulse cleaning to dislodge solids collected thereon into said filter housing; and recovering heat from said hot waste-free gas.

8. The method for decontamination of soil as defined in claim 1 wherein said soil is contaminated with polychlorinated biphenyls.

9. The method for decontamination of soil as defined in claim 8 wherein said hot combustion gases are maintained at a temperature of about 1200° C. in said refractory lined housing.

10. The method for decontamination of soil as defined in claim 1 wherein the ash and decontaminated soil are separated from the hot combustion gases by gravity.

* * * * *